Patented Aug. 25, 1931

1,820,024

UNITED STATES PATENT OFFICE

FERDINAND KELLER AND KARL SCHNITZSPAHN, OF OFFENBACH-ON-THE-MAIN, GERMANY, ASSIGNORS TO GENERAL ANILINE WORKS, INC., OF NEW YORK, N. Y., A CORPORATION OF DELAWARE

DIAZOSALT PREPARATIONS FOR DYEING AND PRINTING

No Drawing. Original application filed December 24, 1925, Serial No. 77,576, and in Germany January 19, 1925. Divided and this application filed January 3, 1929. Serial No. 330,137.

This invention relates to diazosalt preparations for dyeing and printing, which consist of 1.5-napthalenedisulfonic acid diazonium salts of unsulfonated substituted aromatic amines, and to their use in dyeing and printing.

It has further been found that it is advisable under certain conditions to add to the diazonium salt preparations further substances which are useful in dyeing processes.

The 1.5-naphthalenedisulfonic acid diazonium salts may be the neutral salts or the acid 1.5-naphthalenedisulfonic acid diazonium salts of the general formula:

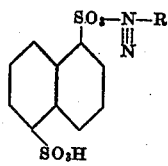

wherein R represents an unsulfonated substituted aromatic radical, which is highly suited for use as stable diazo preparations in dyeing and printing.

The acid diazonium salts of 1.5-naphthalenedisulfonic acids, which have not been described heretofore in the literature, are obtained either by double decomposition reaction of diazo salt solutions which are strongly acid due to mineral acid with a 1.5-naphthalenedisulfonic acid metal salt, or by treating weakly acid mineral acid diazo salt solutions obtained in the customary manner with free 1.5-naphthalenedisulfonic acids of a molecular weight of 288. The tendency to form acid salts varies greatly with the different diazonium bases. In the case of many diazo compounds, they are formed very easily as for example with diazo-3-nitro-4-amino-1-toluene, which yields a product having the following formula:

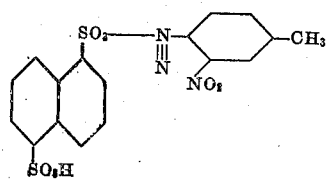

In the case of other diazonium bases they are produced with more difficulty. Many of the acid salts are so stable in water that they can be recrystallized unchanged from warm water at 70° C.; others on the other hand are dissociated, when dissolved in a large amount of water, into neutral salts and free naphthalenedisulfonic acids. The acid salts are more or less strongly colored, fine, crystalline powders, whose aqueous solutions react acid to congo so that their free sulfo-groups can be sharply titrated against congo with normal caustic soda. The acid salts of the neutral 1.5-disulfonates are more frequently of different colors; thus, the acid 1.5-naphthalenedisulfonate obtained from diazotized 3-nitro-4-amino-1-toluene is of a greenish color, in contradistinction to the neutral disulfonate which is of a yellow color.

The acid 1.5-naphthalenedisulfonic acid diazosalts present advantages over the neutral ones in most cases, when used as diazo dyesalts. The acid salts separate out as a rule in a better crystallized condition and are therefore more easily filtered and more easily dried, and at the same time give larger yields than do the neutral salts. In spite of the greater ease of separation the solubility of the acid disulfonates is as a rule noticeably greater than is that of the neutral salts. Furthermore, as a rule the stability of the diazo salt preparations obtained from the acid 1.5-naphthalenedisulfonic acid diazo salts is superior to that of those which are obtained from the neutral salts.

Especially important are the diazo salt preparations obtained from negatively substituted unsulfonated amines especially the negatively substituted aminophenol ethers and of the latter group the nitrated aminophenol ethers.

If it is desired to obtain neutral water solutions which are useful directly for dyeing, from the acid 1.5-naphthalenedisulfonates, the dry acid 1.5-naphthalenedisulfonates can be mixed advantageously with an amount of suitable alkali corresponding to their acidity. Suitable alkalies are for example, magnesia, zinc oxide, calcium hydroxide and neutral alkali metal carbonates or bicarbonates.

The following examples are given to illustrate the invention:

(1) Acid 1.5-naphthalenedisulfonate of diazotized 5-nitro-2-amino-1-anisol of 34–35% diazotized nitroanisidin base content will serve as a stable dyesalt without addition of other substances, or its content may be regulated to the desired proportion by the addition of suitable diluting materials in order to yield to the dyer a product whose dye content is always the same. The aqueous solution of the product is then neutralized with sodium acetate or chalk, for example before use for dyeing, congo being the indicator.

(2) The product obtained by mixing 250 parts of dry acid 1.5-naphthalenedisulfonate of diazotized 3-nitro-4-amino-1-toluene of 31% nitrotoluidine content having the formula:

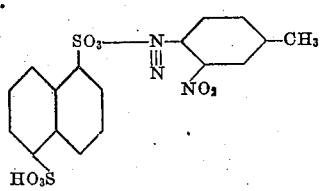

with 40 parts of anhydrous sodium carbonate and 100 parts of aluminium sulfate which has been partly freed from water, possesses a very high stability and good solubility. The sodium carbonate on dissolving enters into a double decomposition reaction with the acid disulfonate. The aqueous solution of the product reacts neutral and is directly useful for dyeing.

(3) The product obtained by intimately mixing 70 parts of acid 1.5-naphthalene-disulfonate of diazotized 4-chlor-2-amino-1-phenylether of 32% chloraminophenylether content having the formula:

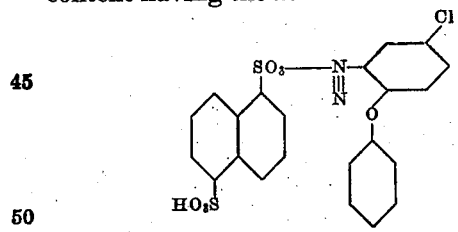

6 parts of prepared chalk and 34 parts of commercial sodium salt of 1.6-naphthalenedisulfonic acid yields in water a dyesalt solution which can be used directly.

This application is a division of our application filed December 24, 1925, issued January 28, 1930, as Patent No. 1,744,903.

We claim:

1. Diazo salt preparations for dyeing and printing comprising a dry acid 1.5-naphthalenedisulfonic acid diazonium salt of an unsulfonated substituted aromatic amine, mixed with an amount of a dry alkali compound corresponding to its acidity.

2. Diazo salt preparations for dyeing and printing comprising a dry acid 1.5-naphthalenedisulfonic acid diazonium salt of an unsulfonated substituted aromatic amine containing one benzene nucleus, mixed with an amount of a dry alkali compound corresponding to its acidity.

3. Diazo salt preparations for dyeing and printing comprising a dry acid 1.5-naphthalenedisulfonic acid diazonium salt of an unsulfonated substituted aromatic amine of the general formula:

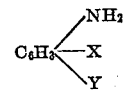

wherein X means halogen or a nitro group, Y an alkyl- or alkoxy group or hydrogen, mixed with an amount of a dry alkali compound corresponding to its acidity.

4. Diazo salt preparations for dyeing and printing comprising a dry acid 1.5-naphthalenedisulfonic acid diazonium salt of an unsulfonated substituted aromatic amine of the general formula:

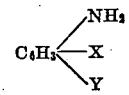

wherein X means halogen or a nitro group, Y an alkyl- or alkoxy group, mixed with an amount of a dry alkali compound corresponding to its acidity.

5. Diazo salt preparations for dyeing and printing comprising a dry acid 1.5-naphthalenedisulfonic acid diazonium salt of an unsulfonated nitrotoluidine, mixed with an amount of a dry alkali compound corresponding to its acidity.

6. Diazo salt preparations for dyeing and printing comprising the dry acid 1.5-naphthalenedisulfonic acid diazonium-salt of nitrotoluidine of the formula:

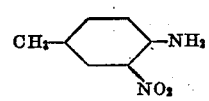

mixed with an amount of a dry alkali compound corresponding to its acidity.

In testimony whereof we affix our signatures.

FERDINAND KELLER.
KARL SCHNITZSPAHN.

CERTIFICATE OF CORRECTION.

Patent No. 1,820,024.             Granted August 25, 1931, to

FERDINAND KELLER ET AL.

It is hereby certified that error appears in the printed specification of the above numbered patent requiring correction as follows: Page 1, line 24, for "is" read are; and that the said Letters Patent should be read with this correction therein that the same may conform to the record of the case in the Patent Office.

Signed and sealed this 8th day of December, A. D. 1931.

(Seal)                                              M. J. Moore,
                                                   Acting Commissioner of Patents.